United States Patent
Chen

(10) Patent No.: US 7,839,333 B2
(45) Date of Patent: Nov. 23, 2010

(54) SATELLITE SEARCH METHOD AND RECEIVER USING THE SAME

(75) Inventor: Kun-tso Chen, Fang-Yuan Hsiang (TW)

(73) Assignee: Mediatek Inc., Hsin-Chu (TW)

( * ) Notice: Subject to any disclaimer, the term of this patent is extended or adjusted under 35 U.S.C. 154(b) by 0 days.

(21) Appl. No.: 12/366,376

(22) Filed: Feb. 5, 2009

(65) Prior Publication Data

US 2009/0179796 A1   Jul. 16, 2009

Related U.S. Application Data

(63) Continuation-in-part of application No. 11/392,976, filed on Mar. 28, 2006, now Pat. No. 7,612,714, and a continuation-in-part of application No. 11/566,009, filed on Dec. 1, 2006, now Pat. No. 7,671,796.

(51) Int. Cl.
*G01S 19/28* (2010.01)
*G01S 19/31* (2010.01)

(52) U.S. Cl. .............. 342/357.67; 342/357.71

(58) Field of Classification Search ........... 342/357.67, 342/357.71
See application file for complete search history.

(56) References Cited

U.S. PATENT DOCUMENTS

| | | | |
|---|---|---|---|
| 5,402,347 A | 3/1995 | McBurney et al. | |
| 5,418,538 A | 5/1995 | Lau | |
| 5,600,670 A | 2/1997 | Turney | |
| 5,663,735 A | 9/1997 | Eshenbach | |
| 5,798,732 A | 8/1998 | Eshenbach | |
| 5,854,605 A | 12/1998 | Gildea | |
| 5,917,444 A | 6/1999 | Loomis et al. | |
| 6,184,824 B1 | 2/2001 | Bode et al. | |
| 6,191,731 B1 | 2/2001 | McBurney et al. | |
| 6,211,817 B1 | 4/2001 | Eschenbach | |
| 6,225,945 B1 | 5/2001 | Loomis | |
| 6,275,185 B1 | 8/2001 | Loomis | |
| 6,324,213 B1 * | 11/2001 | Harrison ............ 375/240 |

(Continued)

FOREIGN PATENT DOCUMENTS

| EP | 1186905 A2 | 3/2002 |
|---|---|---|
| TW | 200602658 | 1/2006 |

OTHER PUBLICATIONS

Kun-tso Chen, A Dynamic Satellite Search Scheduling for GNSS Super Constellation, p. 212-220, ION GNSS 21st. International Technical Meeting of the Satellite Division, Sep. 16-19, 2008, Savannah, GA.

*Primary Examiner*—Thomas H Tarcza
*Assistant Examiner*—Harry Liu
(74) *Attorney, Agent, or Firm*—Kirton & McConkie; Evan R. Witt

(57) ABSTRACT

A satellite search method and a receiver implementing such a method are disclosed. In the present invention, a predetermined range is sampled into multiple possible positions or space-time points, each of which is defined by a specific position and a time sample. The possible positions or points are sieved according to a search result of a satellite selected from candidate satellites each time. By repeatedly doing so, the finally remaining position will approach a user's position, and accordingly the candidate satellites converge to the most possible ones as to facilitate satellite search.

20 Claims, 16 Drawing Sheets

U.S. PATENT DOCUMENTS

| | | |
|---|---|---|
| 6,373,429 B1 | 4/2002 | Eschenbach |
| 6,392,593 B1 | 5/2002 | Pemble |
| 6,400,319 B1 | 6/2002 | Castelloe et al. |
| 6,459,405 B1 | 10/2002 | Da et al. |
| 6,559,793 B1 | 5/2003 | Eschenbach |
| 6,671,620 B1 | 12/2003 | Garin et al. |
| 6,778,136 B2 | 8/2004 | Gronemeyer |
| 6,873,982 B1 | 3/2005 | Bates et al. |
| 2003/0079173 A1 | 4/2003 | Birru |
| 2006/0077096 A1* | 4/2006 | King et al. .............. 342/357.15 |
| 2006/0152409 A1 | 7/2006 | Raman et al. |
| 2006/0250304 A1 | 11/2006 | Mo et al. |
| 2008/0191933 A1 | 8/2008 | Wigren et al. |

* cited by examiner

SATELLITE SEARCH METHOD AND RECEIVER USING THE SAME

RELATED APPLICATIONS

The present application is a continuation-in-part of prior U.S. patent application Ser. No. 11/392,976, entitled: "COLD START SATELLITE SEARCH METHOD", filed on Mar. 28, 2006, and U.S. patent application Ser. No. 11/566,009, entitled "SATELLITE SEARCH METHOD", filed on Dec. 1, 2006. The entirety of each application is hereby incorporated herein by reference.

TECHNICAL FIELD OF THE INVENTION

The present invention relates to a satellite searching, more particularly, to a method for dynamically and rapidly searching satellites and a receiver implementing such a method.

BACKGROUND OF THE INVENTION

Nowadays, multiple Global Navigation Satellite System (GNSS) are available, including GPS (Global Positioning System) of US, which is designed to have 32 operational satellites, Galileo of Europe, which is designed to have 27 operational satellites, GLONASS (GLObal NAvigation Satellite System) of USSR (and later Russia), which is designed to have 24 operational satellites, and Compass of China, which is designed to have 35 operational satellites. The constellation composed of these systems is called super GNSS constellation. In addition Regional Navigation Satellite Systems (RNSS) such as QZSS (Quasi-Zenith Satellite System) of Japan and GAGAN (GPS Aided Augmented Navigation System) of India are also planed to be operable in the near future.

Further, various SBAS (Satellite Based Augmentation Systems) have been developed to augment GNSS, such as WAAS (Wide Area Augmentation System) of US, EGNOS (European Geostationary Navigation Overlay Service) of Europe, MSAS (MTSAT Satellite Based Augmentation System) of Japan, and GAGAN of India.

As can been seen, the current constellation of satellites has been quite dense. As can be easily expected, the sky will be crowded with more and more satellites in the coming future. Therefore, how to search all the satellites quickly becomes more and more challenging for a receiver. As known in this field, searching for a satellite is to determine its satellite ID, Doppler frequency and PRN (Pseudo Random Number) code phase. The hardware speedup for the receiver is usually performed to reduce searching time in acquisition of Doppler frequency and PRN code phase. Little attention has been given to deal with the unknown satellite IDs. As mentioned, there are more and more satellite IDs to try in the satellite search as the constellation becomes larger and larger. It will take a very long period of time to acquire all the visible satellites by using the conventional sequential search method. In such a conventional method, the satellites are searched one by one and in a fixed sequence. The present invention provides a solution to overcome this problem.

SUMMARY OF THE INVENTION

The present invention provides a satellite search method, by which the satellite ID uncertainty can be significantly reduced so that a predetermined or required number of satellites can be rapidly acquired. The present invention also provides a receiver implementing such a method. The method comprises (a) providing a candidate satellite list containing a plurality of satellites; (b) calculating mean visibility of at least one satellite listed in the candidate satellite list for positions with respect to a current time; (c) selecting a satellite from the candidate satellite list according to the mean visibility of each satellite listed in the candidate satellite list; (d) searching the selected satellite to obtain a search result; (e) eliminating at least one position from the possible positions according to the search result; and (f) repeating steps (b) to (e).

The present invention further provides a receiver for receiving and processing satellite signals to conduct a satellite search, the receiver comprises: a correlation block for correlating the satellite signals with a code of a satellite so as to search the satellite; and a navigation processor for controlling the correlation block, wherein the navigation processor provides a candidate satellite list containing a plurality of satellites, calculates mean visibility of at least one satellite listed in the candidate satellite list for possible positions with respect to a current time, instructs the correlation block to search a satellite which is selected according to the mean visibility of each satellite to obtain a search result, and eliminates at least one position from the possible positions according to the search result.

According to the present invention, a satellite with the maximum mean visibility is selected from the candidate satellite list to be searched. The search result of the currently searched satellite is used to eliminate impossible positions from the possible positions so as to reduce the uncertainty range.

In an embodiment of the present invention, each position that the searched satellite is not visible is eliminated if the search result indicates that the searched satellite is acquired, while each position that the searched satellite is visible is eliminated if the search result indicates that the searched satellite is unacquired.

The candidate satellite list can be updated in various manners. In one case, one satellite is removed from the candidate satellite list once it has been searched to update the candidate satellite list, no matter the satellite has been acquired or not. In another case, one satellite is removed from the candidate satellite list once it has been acquired to update the candidate satellite list The present invention further provides a method and a receiver to efficiently reduce satellite ID uncertainty under a situation where time and position are both unknown. One specific time sample and one specific position define a time-space point. Impossible time-space points are eliminated from possible positions according to each search result. By doing so, the satellite ID uncertainty can be rapidly reduced.

BRIEF DESCRIPTION OF THE DRAWINGS

The present invention will be further described in details in conjunction with the accompanying drawings.

DETAILED DESCRIPTION OF THE INVENTION

When a receiver starts, the first task is to search all the visible satellites in the sky. Satellite visibility relates to a user's position, system time (e.g. GPS time) and satellite orbital information. The satellite orbital information is from data collected in the last fixing of the receiver or from a remote aiding data server. The receiver can determine the satellite visibility by checking an elevation angle of a satellite with respect to the receiver, for example. A specific satellite is deemed as visible when the elevation angle is greater than 5 degrees. Otherwise, this satellite is deemed as invisible. However, in addition to the elevation angle of the satellite with respect to the receiver's position, the visibility of each satellite can be determined by any other proper method. The satellite visibility can be expressed as a function of the user's position, the system time and the satellite orbit information. If the user's rough position, the rough time (e.g. time provided by RTC (real time clock) unit of the receiver) and rough satellite orbit information (e.g. the six Kepler orbit parameters or an almanac) are known, it is possible to derive which satellites are visible under such a condition. Reversely, the user's position can be approached by using the fact that a satellite is visible or not if the current system time (e.g. current GPS time) and satellite orbit information are known. The present invention is developed based on this concept.

In the following descriptions, GPS with 32 satellites (SV1, SV2, ..., SV32) is taken as an example. However, the present invention is not limited thereto.

Figure 1:
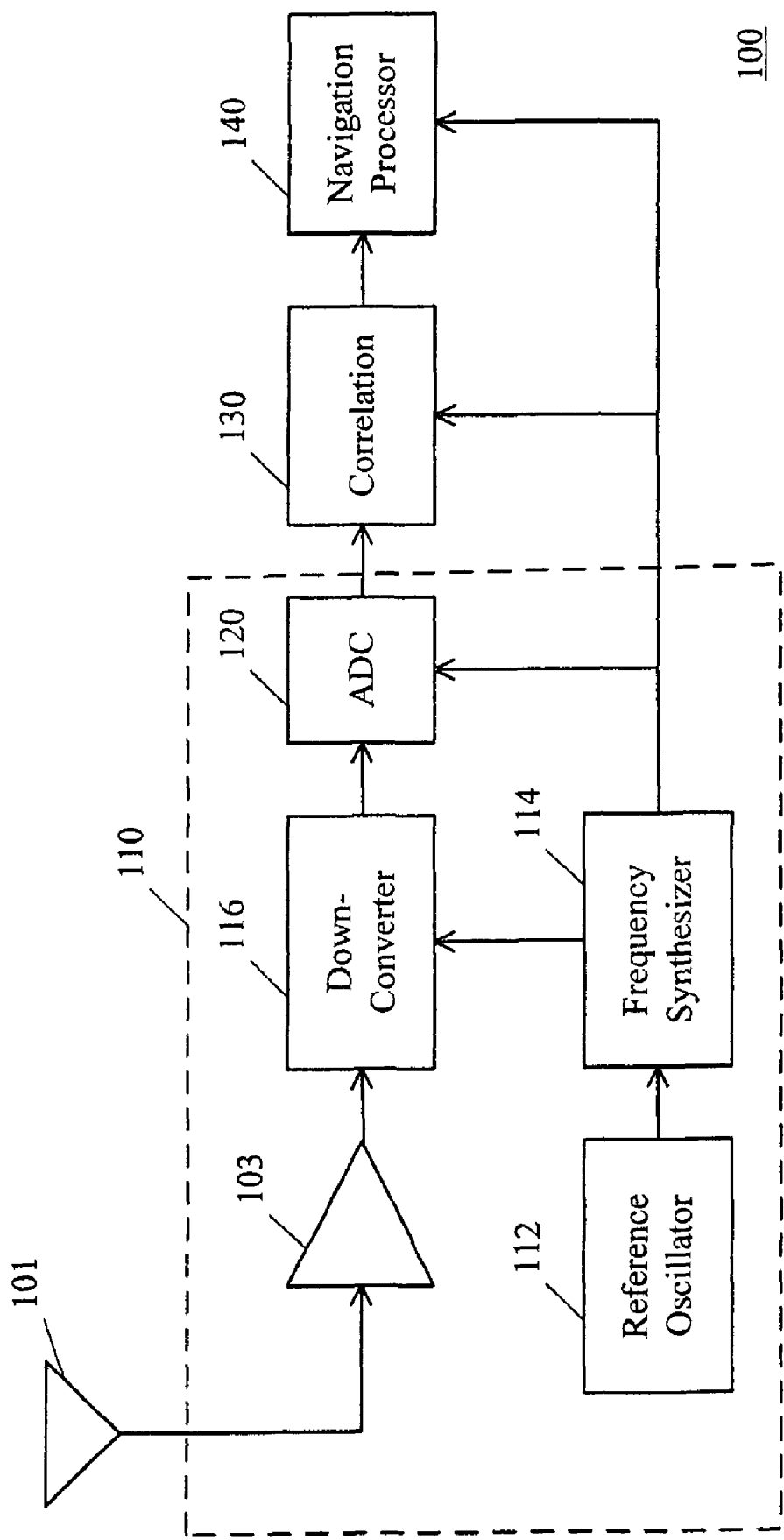
FIG. 1 is a block diagram showing a receiver in accordance with the present invention.

FIG. 1 is a block diagram showing a receiver 100 in accordance with the present invention. The receiver 100 receives and processes satellite signals such GPS signals or other satellite system signals to position a user's location. For example, GPS signals, which are radio frequency (RF) signals, of all satellites are received by an antenna 101. The RF signals are amplified by a preamplifier 103. The amplified signals are then down converted by a down-converter 116 into intermediate frequency (IF) or baseband signals, using signal mixing frequencies provided by a frequency synthesizer 114, which uses a reference clock provided by a reference oscillator 112 to generate the required frequencies. The IF or baseband signals are converted into digital signals by an analog-to-digital converter (ADC) 120. In general, the preamplifier 103, down-converter 116, frequency synthesizer 114, oscillator 112 and ADC 120 can be considered as a whole and referred to as an RF block 110 for dealing with RF signal processing. The digital signals are then passed to a correlation block 130 to be correlated with codes of satellites (e.g. PRN codes) and Doppler shifts to obtain correlation results so as to lock the satellite code phase and Doppler bin. This is known as satellite search. The correlation results from the correlation block 130 are provided to a navigation processor 140 to judge acquisition of the satellites. The correlation block 130 is controlled by the navigation processor 140 to execute satellite search and/or tracking. The details will be further described later.

In the present embodiment, multiple positions are sampled for the whole world every 5 degrees of the longitudes and latitudes, and therefore there will be 72×35=2520 possible positions, which are expressed by {longitude, latitude} such as {0, −85}, {0, −80}, ..., {0, 85}, ..., {5, −85}, {5, −80}, ..., {5, 85}, ..., {355, −85}, {355, −80}, ..., {355, 85}. However, the possible positions can be sampled by any other suitable method. For example, the geometrical shape of the Earth can be considered so that fewer positions are sampled in the high latitude region while more positions are sampled in the low latitude region. In another case, only positions of specific region(s) are included into the possible positions.

Figure 2:
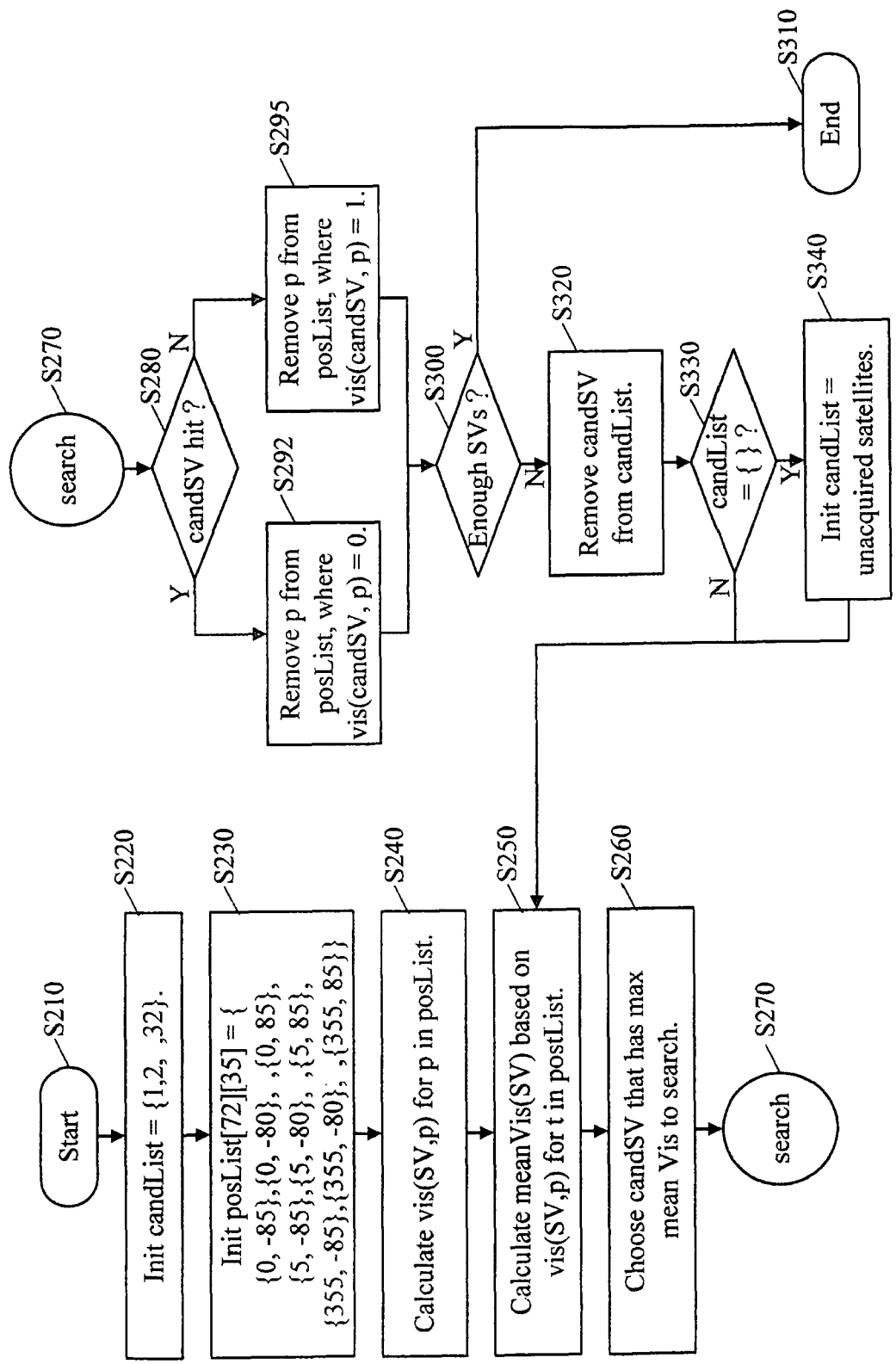
FIG. 2 is a flow chart showing a space search method in accordance with the present invention.

FIG. 2 is a flow chart showing a space search method in accordance with the present invention. The method starts at step S210. In step S220, an initial candidate satellite list "candList" including all the 32 satellites of GPS is set in the navigation processor 140. That is, candList={1, 2, ..., 32}. In step S230, an initial possible position list "posList" including all the positions of the whole world is set is the navigation processor 140. That is, posList={{0, −85}, {0, −80}, ..., {0, 85}, ..., {5, −85}, {5, −80}, ..., {5, 85}, ..., {355, −85}, {355, −80}, ..., {355, 85}}. As mentioned, the possible positions can be set in other manners. It is noted that the sequence of the steps 220 and 230 is arbitrary. These two steps can also be executed in parallel.

In step S240, a visibility "vis(SV, p)" of each satellite at the current time or a specific time is calculated for each possible position. As mentioned, the visibility can be derived from the position, time and satellite orbital information. If a specific satellite (e.g. SV1) is visible at a specific position (e.g. p={0, −85}), the visibility thereof is 1, that is, vis(SV, p)=vis(SV1, {0, −85})=1. If the satellite SV1 is invisible at that position, the visibility thereof is 0, that is, vis(SV, p)=vis(SV1, {0, −85})=0.

In step S250, a mean visibility of each satellite "meanVis(SV)" of the candidate satellite list for the possible positions is calculated as:

$$meanVis(SV) = \frac{1}{|posList|} \sum_{t \in posList} vis(SV, p) \quad (1)$$

where |posList| is the number of positions in posList.

In the beginning, the mean Vis(SV) is calculated for each satellite SV1 to SV32 with respect to all the positions of the whole world in this example. That is, the user can be at any of the listed positions. It is found that the mean visibility of SV23 is the highest. This means that the satellite SV23 is most probably visible for the user at the current system time. Accordingly, the navigation processor 140 chooses SV23 as the candidate satellite "candSV" to be searched (step S260) and instructs the correlation block 130 to execute correlation for searching SV23 (step S270). In step S280, the navigation processor 140 determines if SV23 is hit or not. If SV23 is hit (i.e. acquired), then the positions where SV23 is not visible are all removed from the possible position list posList. That is, the navigation processor 140 removes each p for vis(candSV, p)=0 from posList (step S292). If SV23 is not hit (i.e. missed, unacquired), then the positions where SV23 is visible are removed from the possible position list posList. That is, the navigation processor 140 removes p for vis(candSV, p)=1 from posList (step S295). No matter what the search result is, the amount of the possible positions is significantly decreased. That is, the user's position uncertainty range reduces. It is noted that the search result of "missed" should be carefully verified to make sure that the searched satellite is indeed unacquired. For example, an integration interval for correlation may be extended and then the extended interval is used in correlation to search the satellite again.

In step S300, the navigation processor 140 determines whether a predetermined number of satellites have been acquired. If so, the process can be ended at step S310. Otherwise, the process goes to step S320, in which the candidate satellite list candList is updated. In the present embodiment, once a satellite has been searched, it is removed from candList no matter it is hit or not. In another embodiment, only if a satellite is hit, then it is removed from candList. After updating candlist, the navigation processor 140 determines whether the candidate satellite list candList is empty in step S330. If the candidate satellite list candList is not empty (i.e. candList≠{ }), it means that the current round of search has not been finished yet. The process goes back to step S250, the navigation processor 140 calculates the mean visibility for each candidate satellite of the updated candList based on the reduced posList. In the present embodiment, if the candidate satellite list candlist is empty (i.e. candlist={ }), the navigation processor 140 puts all the unacquired satellites into the list to form a new initial candidate satellite list for the next round of search in step S340, and the process goes back to step S250 to run the next round of search.

An experimental example will be given as follows to reveal the effects of the present invention. FIG. 3 to FIG. 13 respectively show visible positions and mean visibilities of candidate satellites in eleven searches of this example. In each drawing of FIG. 3 to FIG. 13, the upper chart shows that visible region of candidate satellites; and the lower chart shows the mean visibility of each candidate satellite.

In the beginning, all of the 32 GPS satellites are candidate satellites. That is, the candidate satellite list candList includes the 32 GPS satellites. The position $p_0$ is unknown. At a specific current time (e.g. GPS time), the position that each of the 32 GPS satellites is visible is marked in the upper chart of FIG. 3. In this embodiment, at time $t_0$, satellites SV2, 4, 5, 10, 12, 13, 17 and 26 should be visible in this assumed example. As described, the visibility vis(SV, p) of each satellite SV1 to SV32 can be determined to be 0 or 1 according to the user's position, the satellite orbital information and the GPS system time. The mean visibilities of the respective 32 GPS satellites for all the positions are calculated. The result is shown in the lower chart in FIG. 3. In this example, the satellite SV23 has the maximum mean visibility for the whole world. Therefore, SV23 is selected as the first satellite to be searched.

Figure 3:
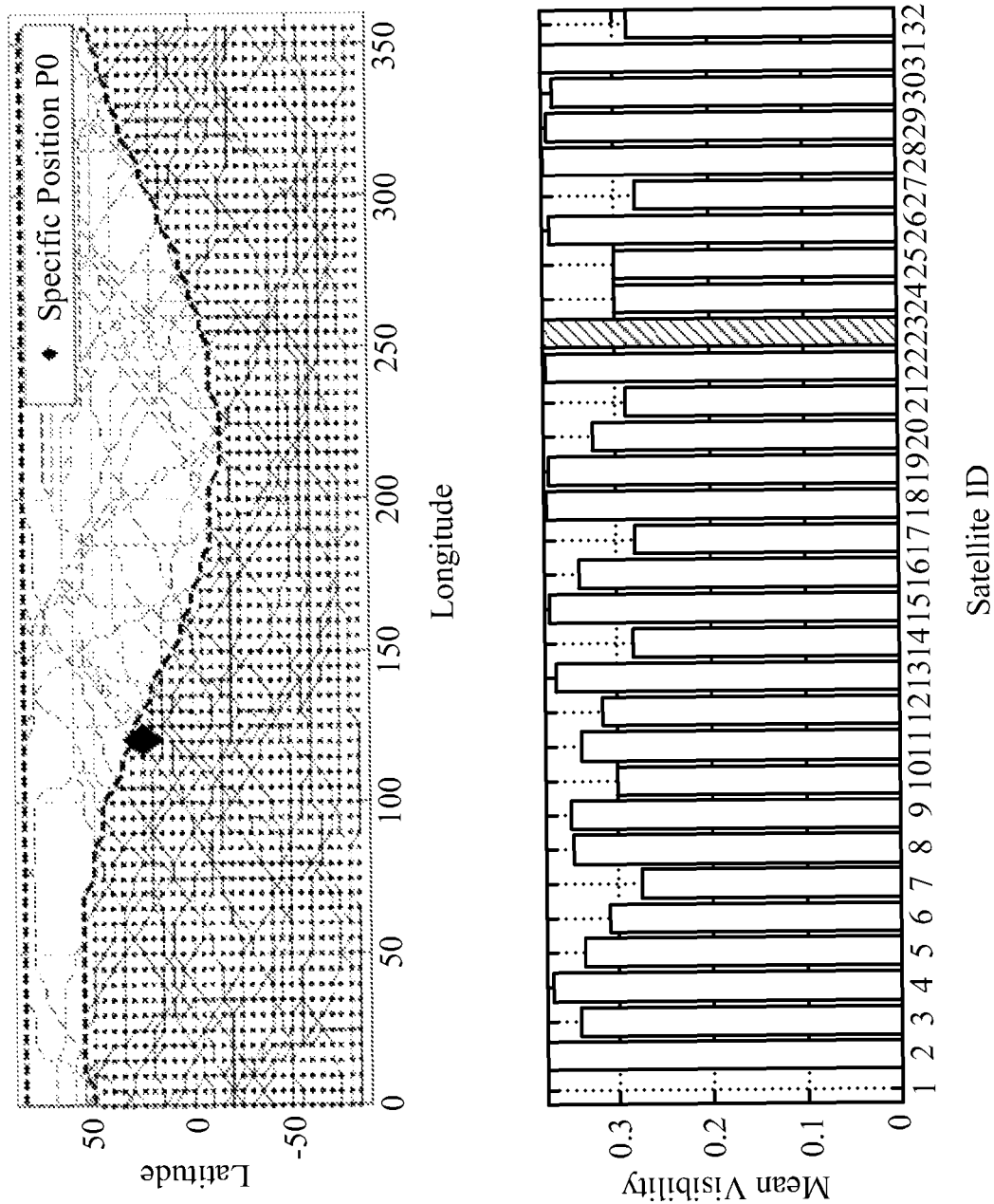
FIG. 3 to FIG. 13 respectively show visible positions and mean visibilities of the respective candidate satellites in eleven searches using the method in accordance with the present invention.
Figure 4:
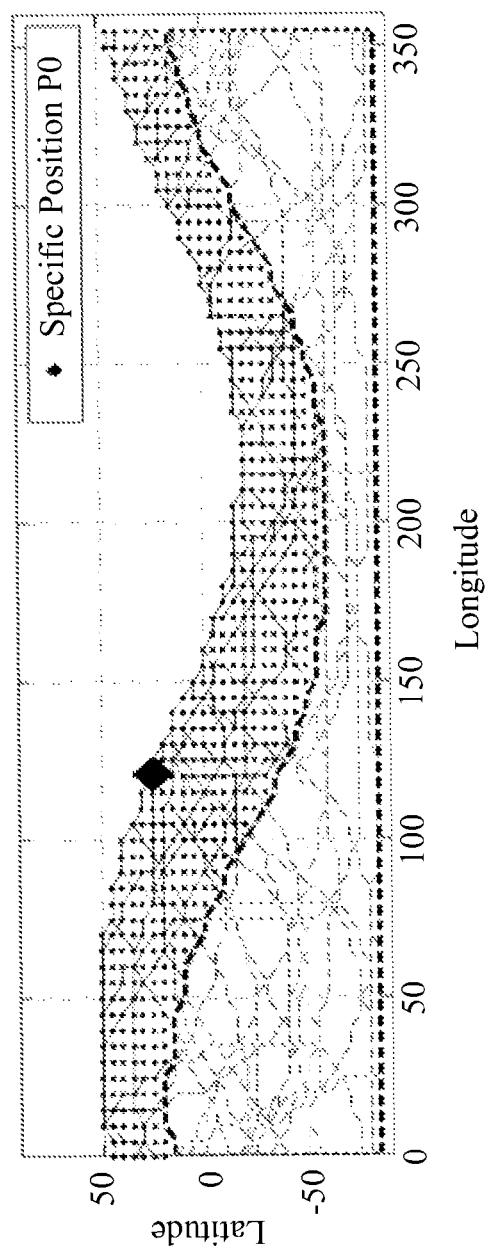
Figure 4:
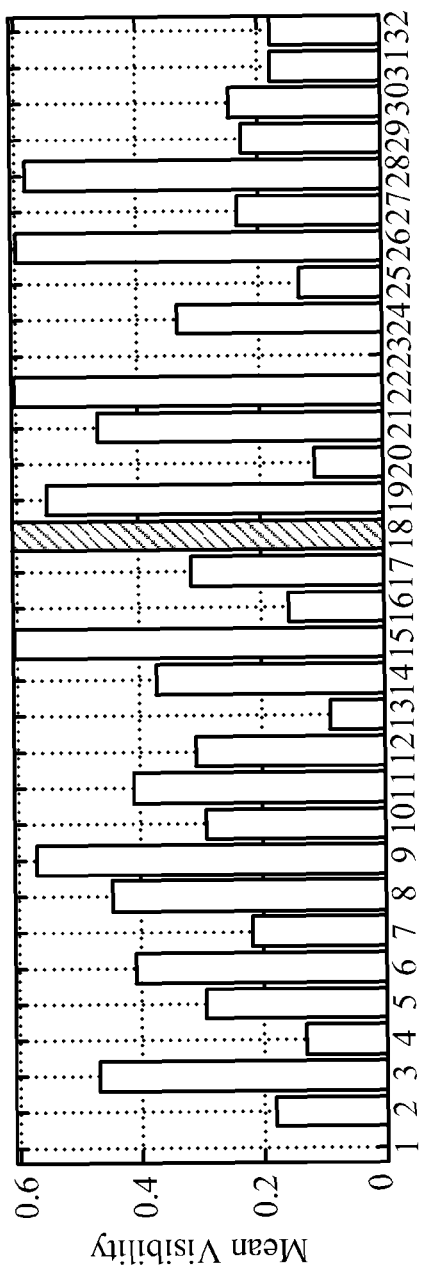
Figure 5:
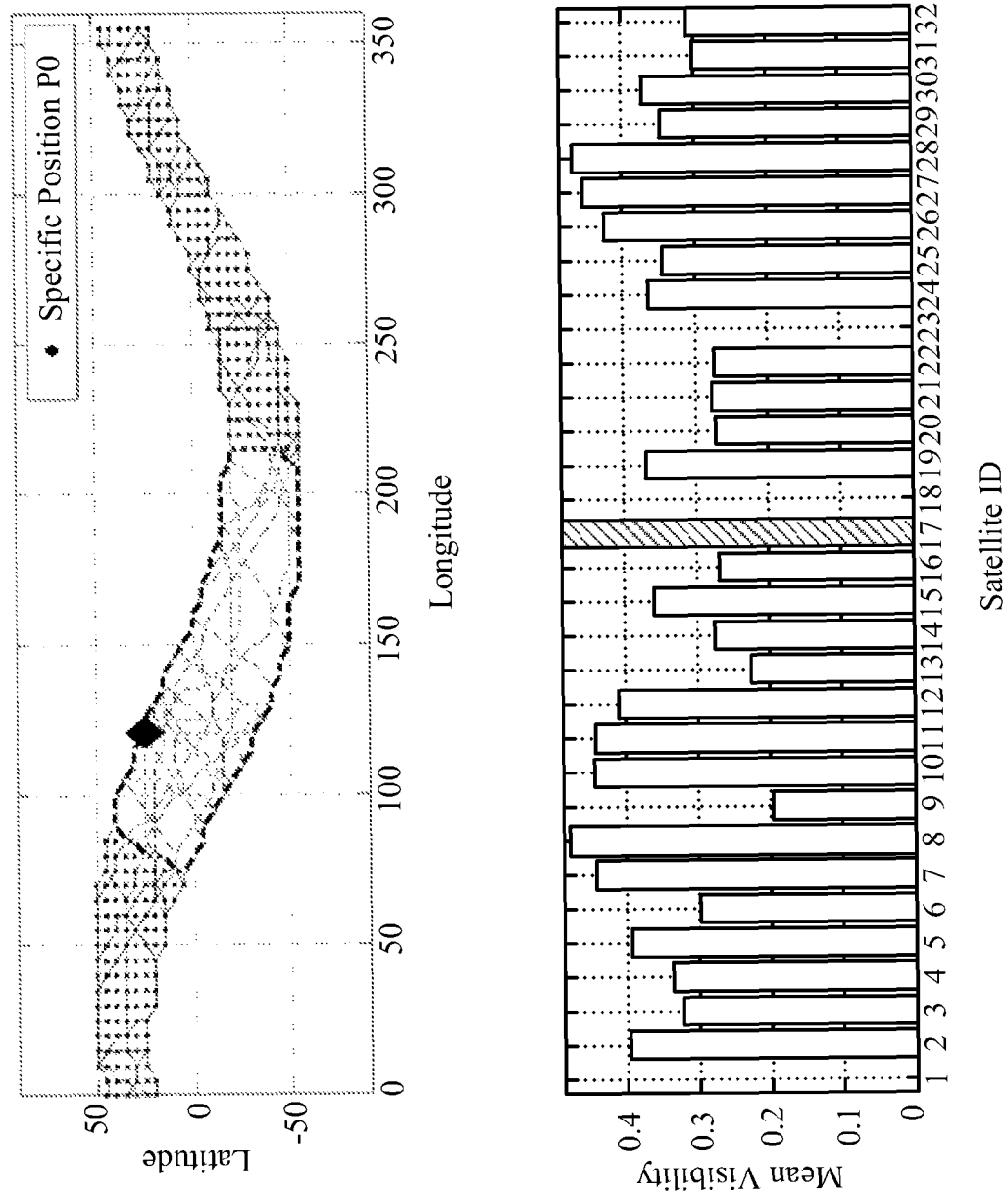
Figure 6:
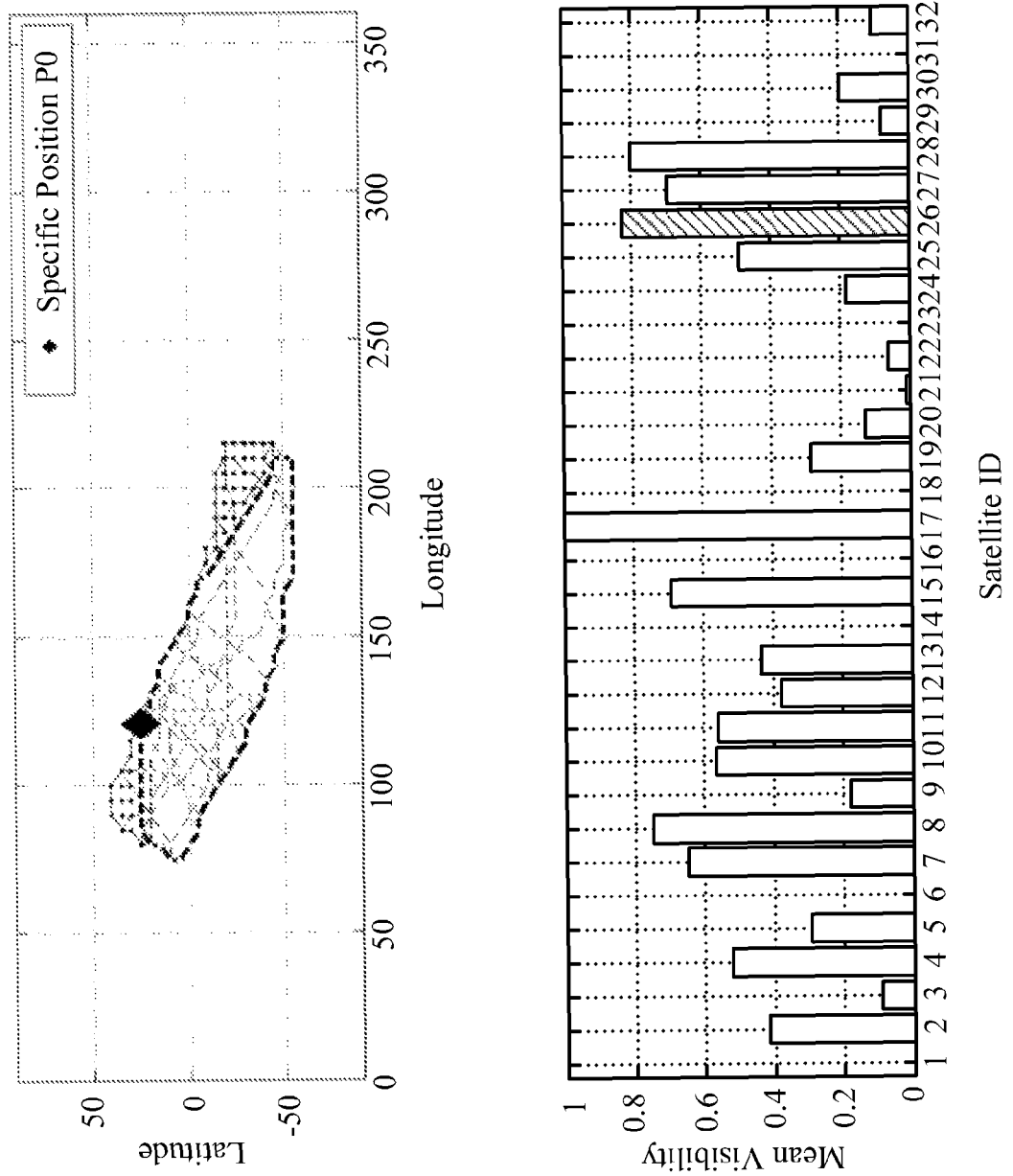
Figure 7:
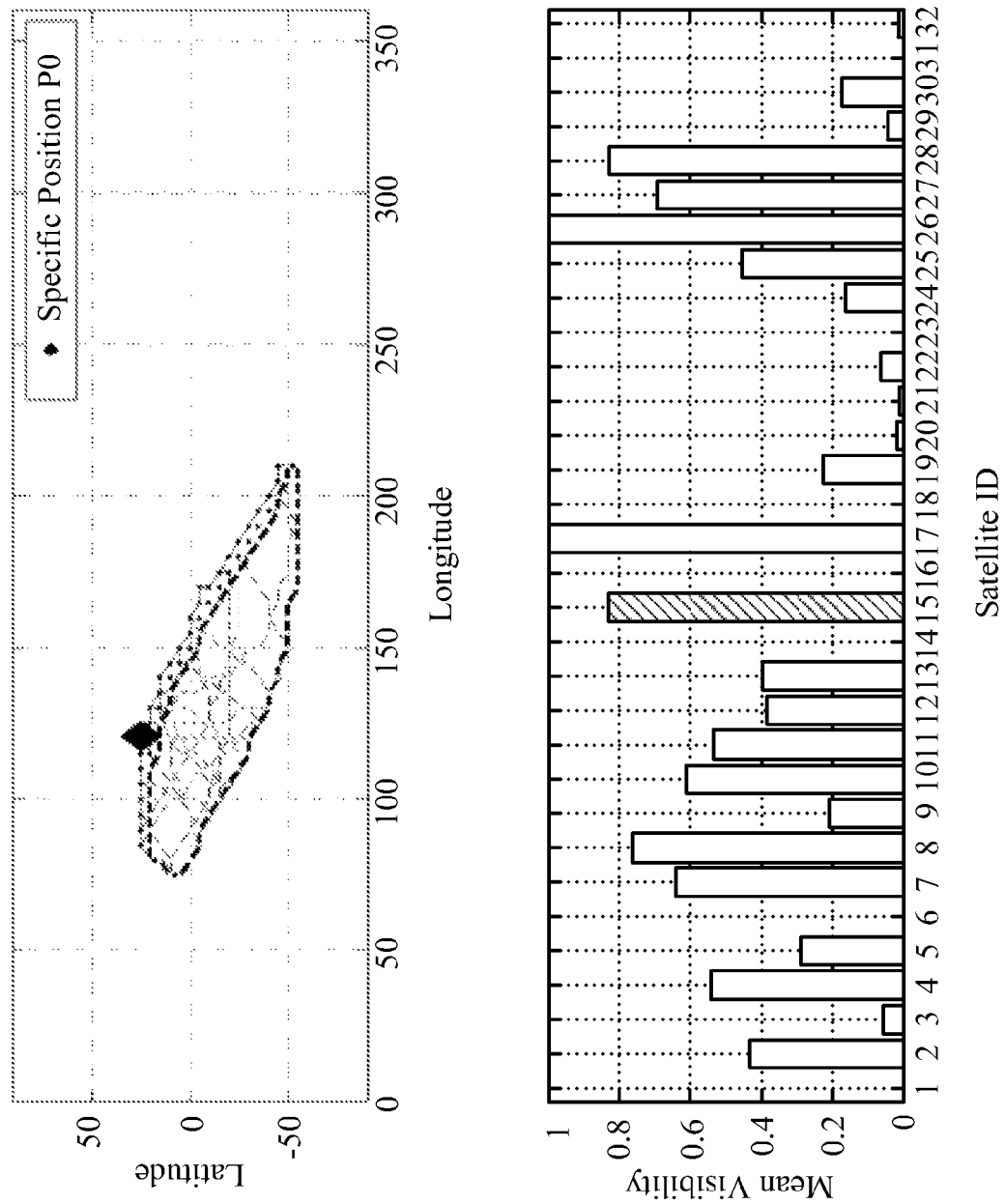
Figure 8:
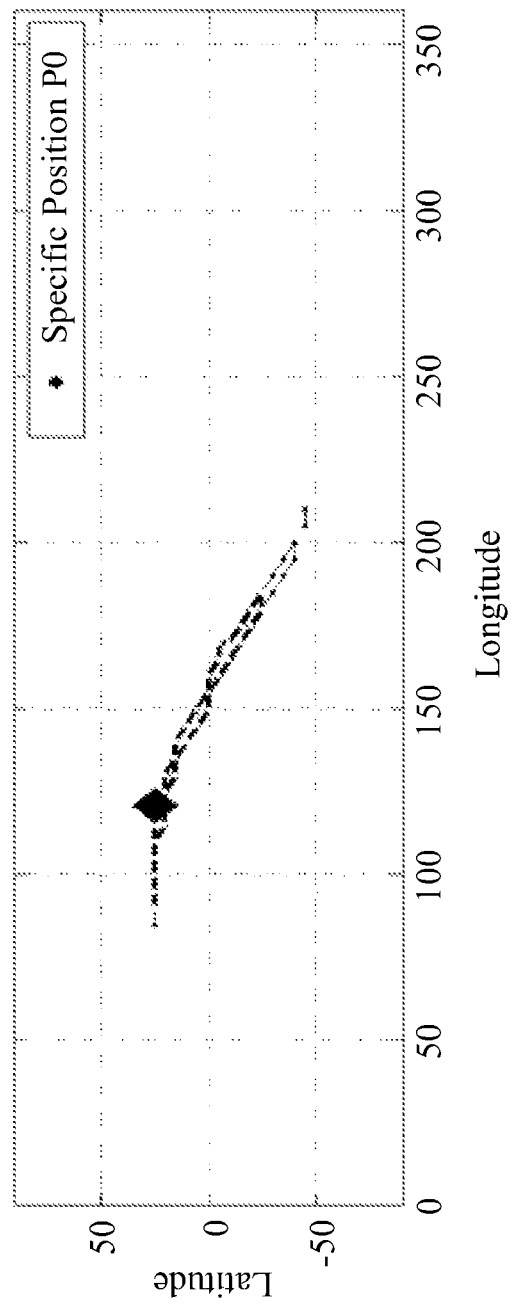
Figure 8:
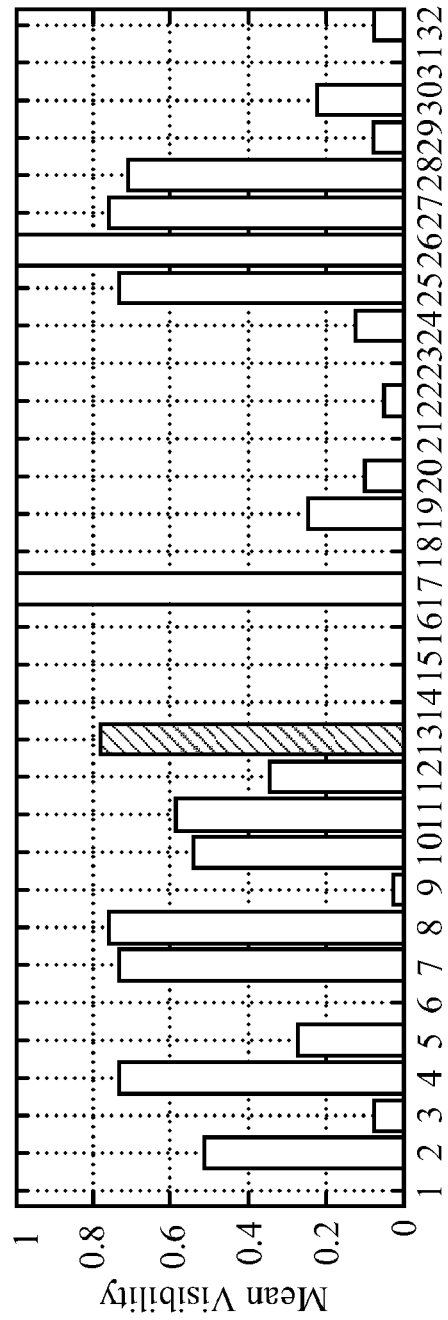
Figure 9:
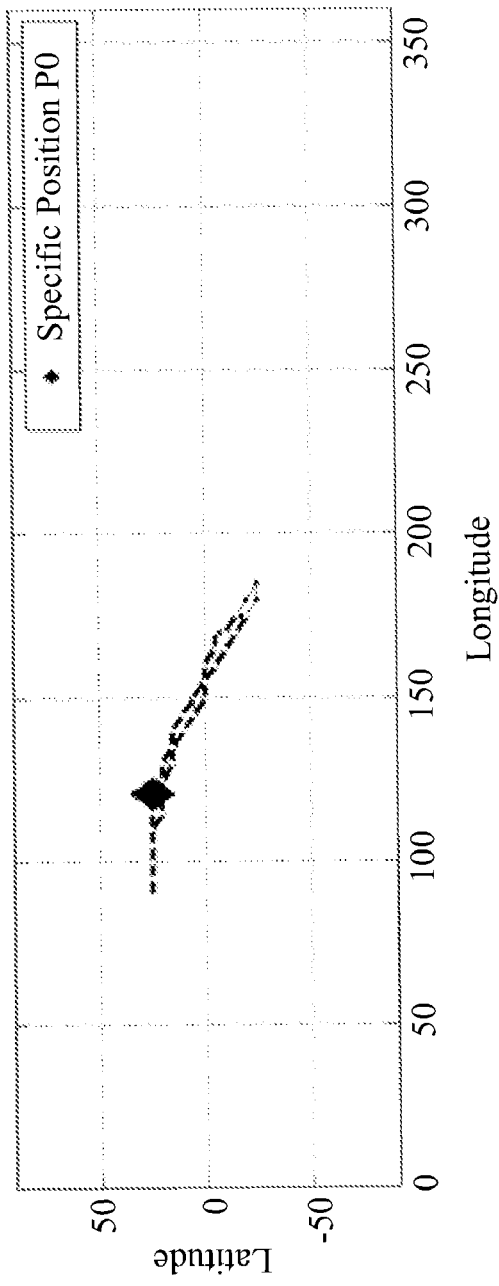
Figure 9:
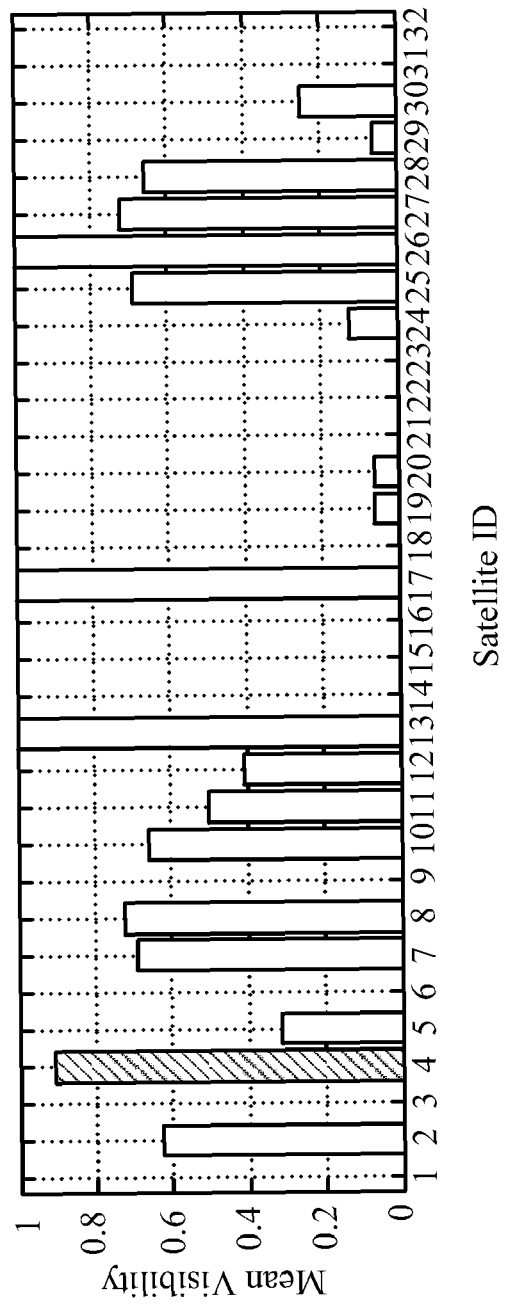
Figure 10:
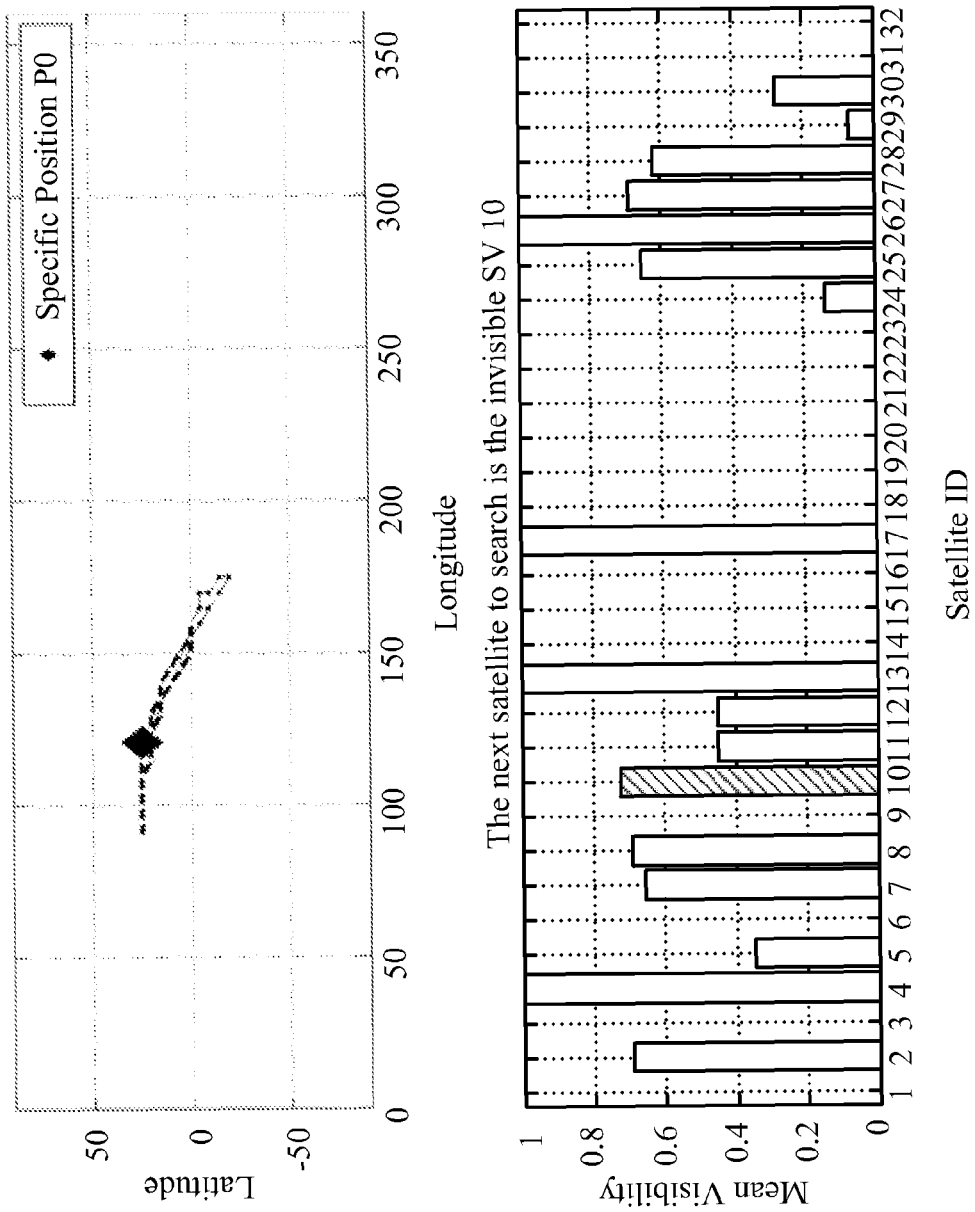
Figure 11:
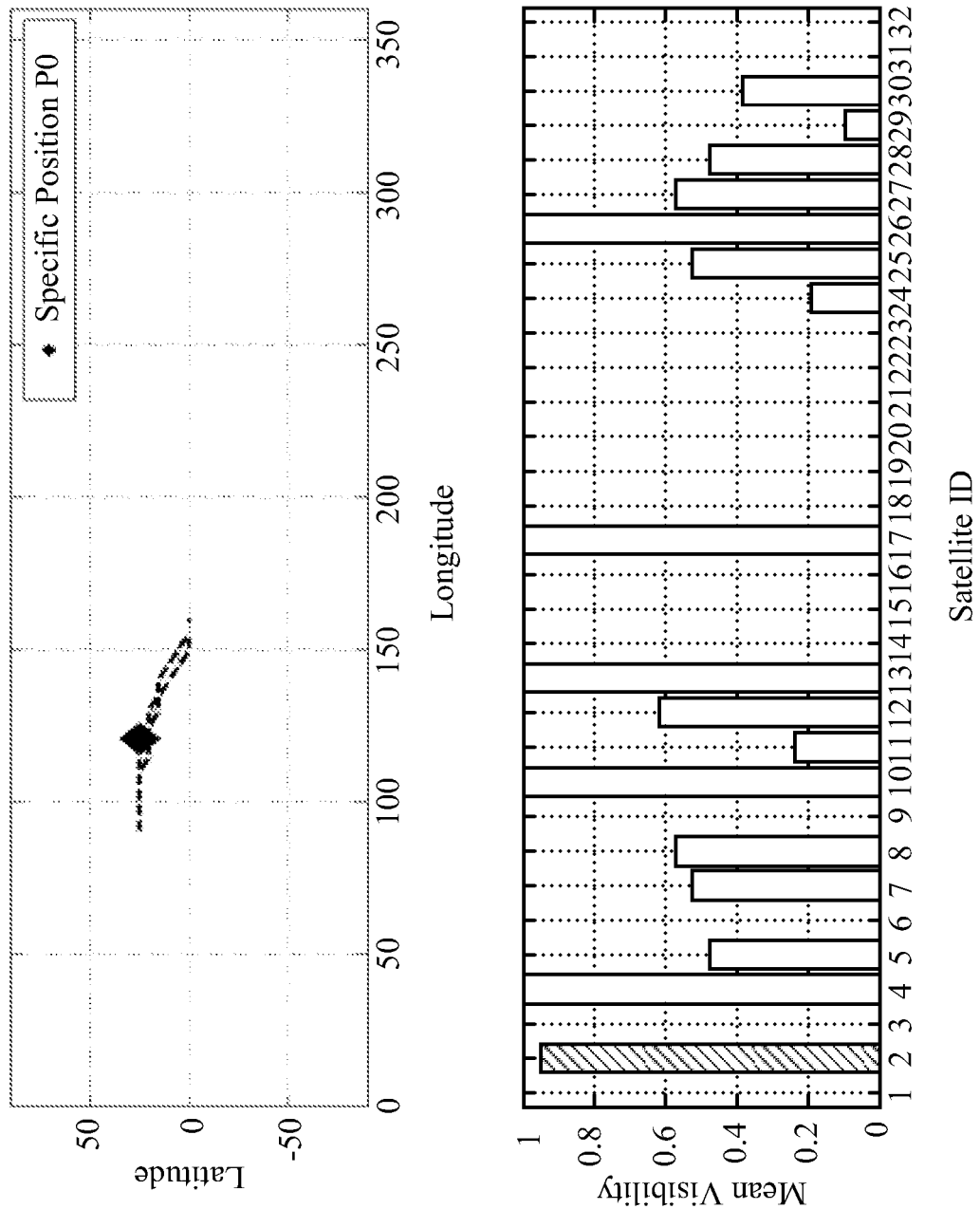
Figure 12:
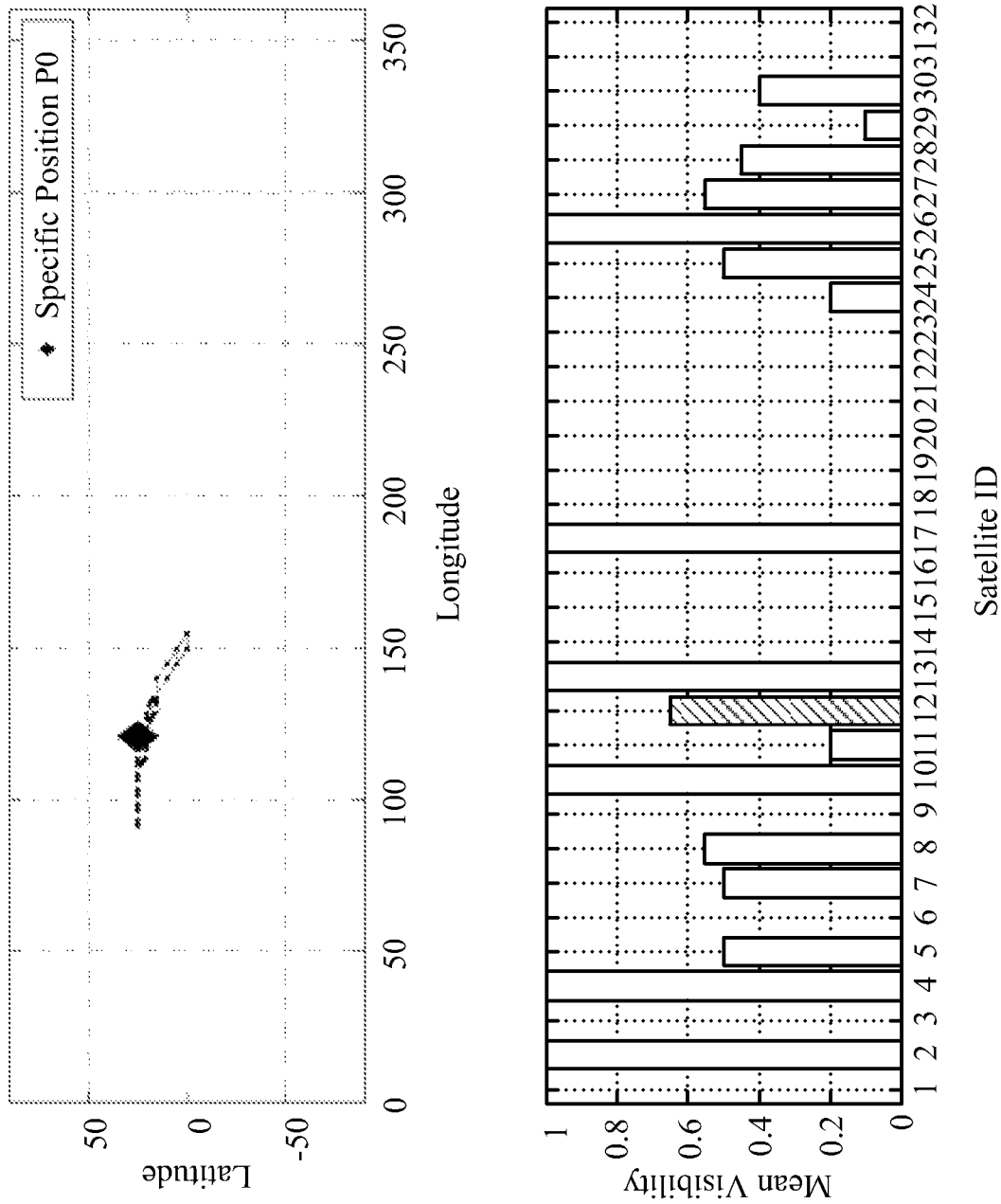
Figure 13:
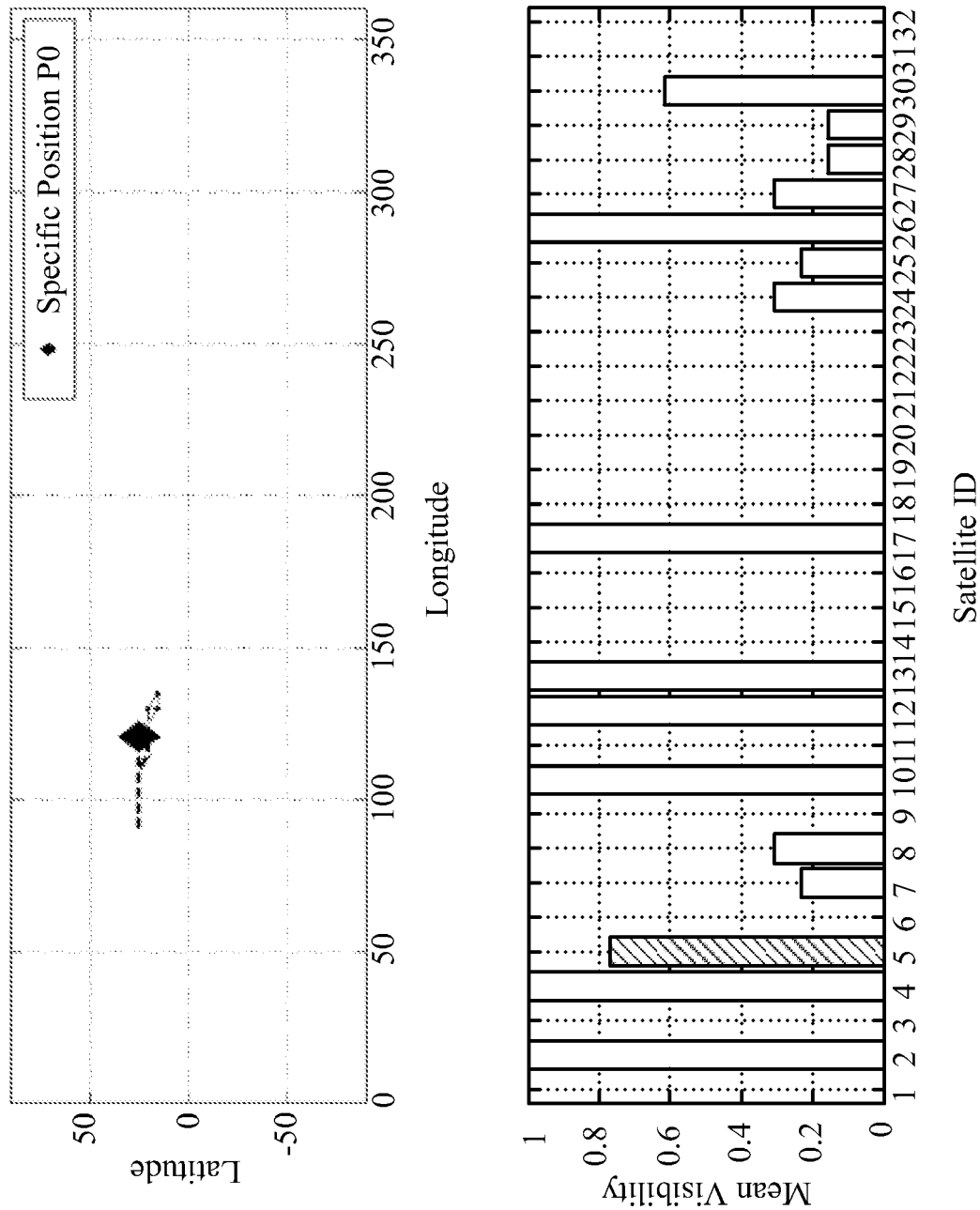

As shown in the upper chart o'FIG. 3, in which the range includes the positions where SV23 is visible is shaded, at the specific position $p_0$, the satellite SV23 is not visible. Therefore, the search result for SV23 should be "missed" (i.e. un-acquired). Based on the search result of SV23 (i.e. missed), the positions where SV23 is visible are eliminated from the possible positions. The resultant position chart is shown in the upper chart of FIG. 4. As can be seen, the uncertainty range is significantly reduced.

As mentioned, the possible positions are decreased. The mean visibilities of all the satellites for the remaining possible positions are re-calculated. The result is shown in the lower chart of FIG. 4. As can be seen, the satellite SV18 has the maximum mean visibility at this stage. Accordingly, SV18 is selected as the second satellite to be searched. In the upper chart, the range includes the positions where SV18 is visible is shaded.

It is noted that each satellite is only searched once in one round of search no matter it is hit or not in this example. Therefore, in the second search, SV23 has been removed from the candidate satellite list.

At the specific position $p_0$, the satellite SV18 is invisible. Therefore, the search result for SV18 should be "missed". The positions that SV18 is visible are then eliminated. The result is shown in the upper chart of FIG. 5. The possible positions are further reduced. The mean visibilities of all the satellites for the remaining possible positions are re-calculated again. The result is shown in the lower chart of FIG. 5. Since SV18 has been searched, it is removed from the candidate satellite list. That is, the candidate satellite list is again updated. The satellite SV17 has the maximum visibility in the updated candidate satellite list at this stage. Accordingly, SV17 is selected as the third satellite to be searched. In the upper chart, the range includes the positions where SV17 is visible is shaded.

As can be seen, the satellite SV17 is visible. Therefore, the search result for SV17 should be "hit" (i.e. acquired). The positions that SV17 is invisible are then eliminated. The result is shown in the upper chart of FIG. 6. The possible positions are further reduced. The mean visibilities of all the satellites for the remaining possible positions are re-calculated again. The result is shown in the lower chart of FIG. 6. Since SV17 has been searched, it is removed from the candidate satellite list. That is, the candidate satellite list is again updated. The satellite SV26 has the maximum visibility in the updated candidate satellite list at this stage. Accordingly, SV26 is selected as the next satellite to be searched. In the upper chart, the range includes the positions where SV26 is visible is shaded.

At the specific position $p_0$, the satellite SV26 is visible. Therefore, the search result for SV26 should be "hit." The positions that SV26 is invisible are then eliminated. The result is shown in the upper chart of FIG. 7. The possible positions are further reduced again. The mean visibilities of all the satellites for the remaining possible positions are re-calculated again. The result is shown in the lower chart of FIG. 7. As can be seen, except the satellites which have been searched, the satellite SV15 has the maximum mean visibility. Accordingly, SV15 is selected as the next satellite to be searched. In the upper chart, the range includes the positions where SV15 is visible is shaded.

At the specific position $p_0$, the satellite SV15 is invisible. Therefore, the search result for SV15 should be "missed" (not hit). The positions that SV15 is visible are then eliminated. The result is shown in the upper chart of FIG. 8. The possible positions are further reduced again. The mean visibilities of all the satellites for the remaining possible positions are recalculated again. The result is shown in the lower chart of FIG. 8. As can be seen, except the satellites which have been searched, the satellite SV13 has the maximum mean visibility. Accordingly, SV13 is selected as the next satellite to be searched. In the upper chart, the range includes the positions where SV13 is visible is shaded.

After searching SV13, the above process is repeated again and again to search the satellites SV4, SV10, SV2, SV12, and SV5, the relevant charts are shown in FIG. 9 to FIG. 13.

Figure 14:
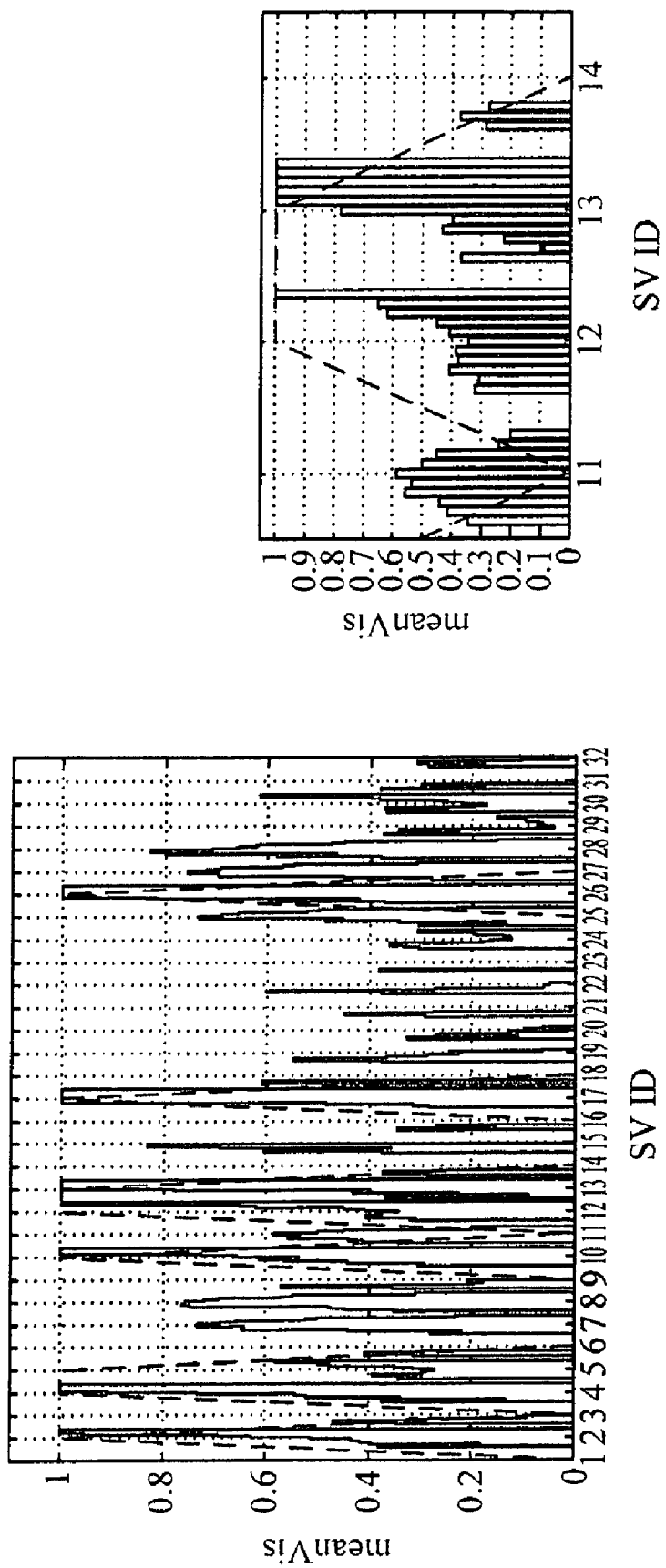
FIG. 14 is a chart showing calculated mean visibilities of the respective satellites for the first six searches using the method in accordance with the present invention.

After eleven satellite searches, all the eight visible satellites are found. FIG. 14 is a chart showing calculated mean visibilities of the respective satellites for the respective searches at the left side. The chart at the right side is a partially enlarged view of the chart at the left side. As can be seen, the mean visibilities of SV12 and SV13 increase during the eleven satellite searches. However, the mean visibilities of SV11 and SV14 are decreased.

In additional to executing the method of the present invention to the end, when several satellites have significantly high mean visibilities (e.g. approaching 1) after the method of the present invention has been executed for some rounds, these sieved satellites can also be searched in sequence at this stage.

By using the method of the present invention to dynamically schedule the candidate satellites to be searched, all the eight visible satellites SV2, 4, 5, 10, 12, 13, 17 and 26 are acquired in 11 searches as described. In comparison, if the conventional sequential search method is used, 26 searches are required to acquire the eight satellites.

The present invention can also be applied in a more general situation where the rough user position and system time are both not available. Under such a situation, we can use satellite search results to estimate the user's position and the system time. Here we also take GPS receiver for an example. Assumed that rough satellite orbital data such as almanac is known, which the rough user position and system time are both unknown. We define the mean visibility of a satellite vis(SV, t, Lc, L) to be the probability to see a satellite anywhere and anytime. A space-time point P(t. Lc, L) indicates a point at a specific system time and at a specific location with specific longitude and latitude herein. However, other expressions can also be used.

Figure 15:
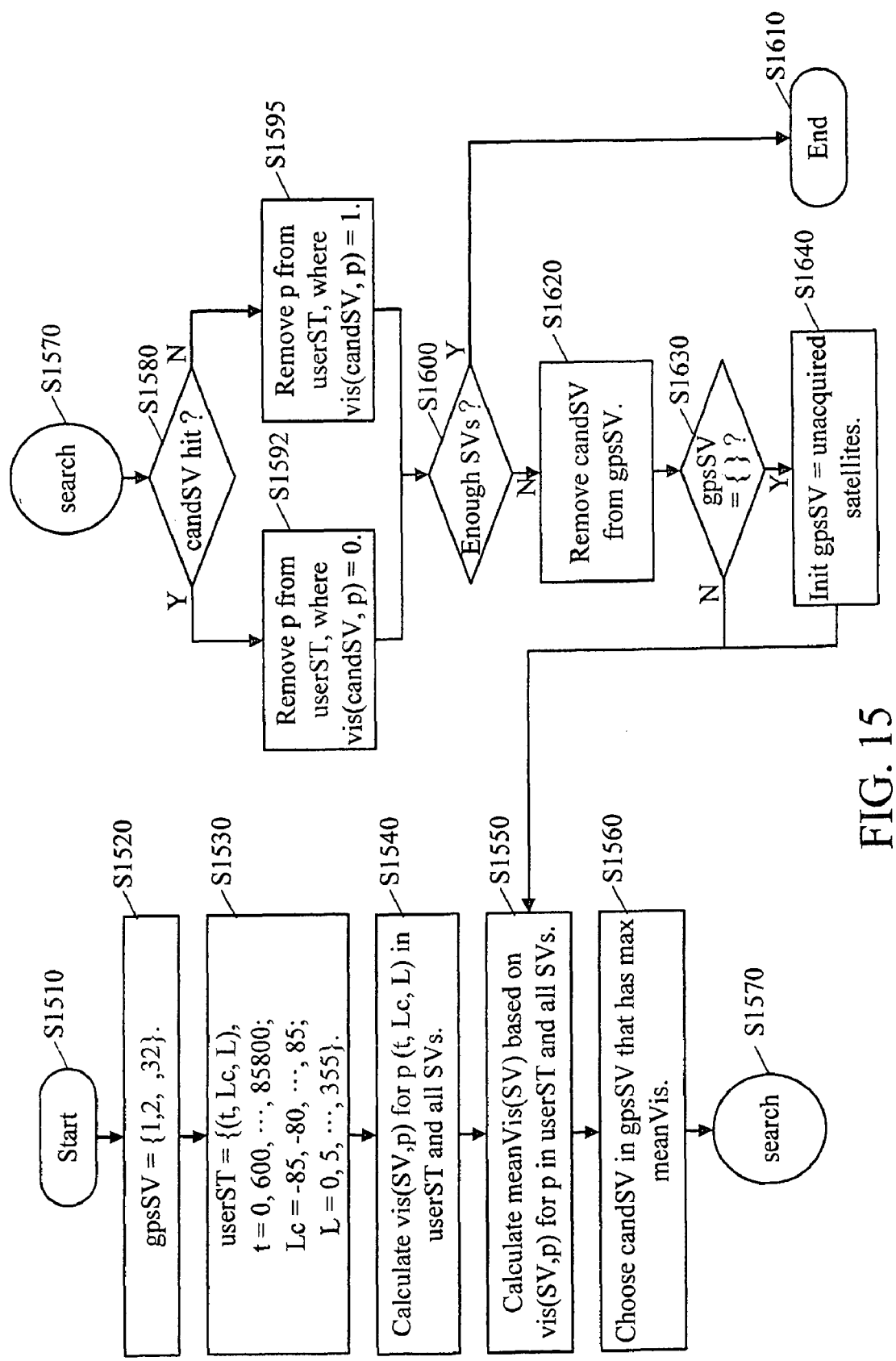
FIG. 15 is a flow chart showing a space-time method in accordance with the present invention.

FIG. 15 is a flow chart showing a space-time search method in accordance with the present invention. In the present embodiment, multiple positions are sampled for the whole world every 5 degrees of the longitudes and latitudes, and therefore there will be 72×35=2520 possible positions, which are expressed by {longitude, latitude} such as {0, −85}, {0, −80}, ... , {0, 85}, ... , {5, −85}, {5, −80}, ... , {5, 85}, ... , {355, −85}, {355, −80}, ... , {355, 85}. In addition, a predetermined time period of 24 hours is chosen in the present embodiment since the revolution period of the GPS satellite is about 24 hours. The period of 24 hours (i.e. 86400 seconds) is sampled every 600 seconds, and therefore there are 144 time samples.

The method starts at step S1510. In step S1520, an initial candidate satellite list "candList" including all the 32 satellites of GPS is set in the navigation processor 140. That is, candList={1, 2, ... , 32}. In step S1530, an initial possible point list "userST" including all the points of the whole world and all time samples is set in the navigation processor 140, wherein t (time)=0, 600, ... , 85800; Lc (latitude)=−85, −80, ... , 85; and L (longitude)=0, 5, ... , 355. As mentioned, the possible points can be set in other manners. It is noted that the sequence of the steps 1520 and 1530 is arbitrary. These two steps can also be executed in parallel.

In step S1540, a visibility "vis(SV, P)" of each satellite for each space-time point P=(t, Lc, L) in userST is calculated.

In step S1550, a mean visibility of each satellite "mean Vis(SV)" of the candidate satellite list for the possible positions is calculated as:

$$meanVis(SV) = \frac{1}{|userST|} \sum_{t \in userST} vis(SV, P) \quad (2)$$

where |userST| is the number of space-time points in userST.

In the beginning, the mean Vis(SV) is calculated for each satellite SV1 to SV32 with respect to all the points in this example. That is, the user can be at any of the listed points. In step S1560, the navigation processor 140 chooses a satellite with the maximum mean visibility as the candidate satellite "candSV" to be searched and instructs the correlation block 130 to execute correlation for searching the candidate satellite candSV (step S1570). In step S1580, the navigation processor 140 determines whether candSV is hit or not. If it is hit (i.e.

acquired), then the points where candSV is not visible are all removed from the possible point list userST. That is, the navigation processor 140 removes each P for vis(candSV, P)=0 from userST (step S1592). If it is not hit (i.e. missed, unacquired), then the points where candSV is visible are removed from the possible point list userST. That is, the navigation processor 140 removes P for vis(candSV, P)=1 from userST (step S1595). If the search result is "unacquired", it is preferred that the search result is verified as the above embodiment. No matter what the search result is, the amount of the possible space-time points is significantly decreased. That is, the user's space-time uncertainty range reduces.

Figure 16:
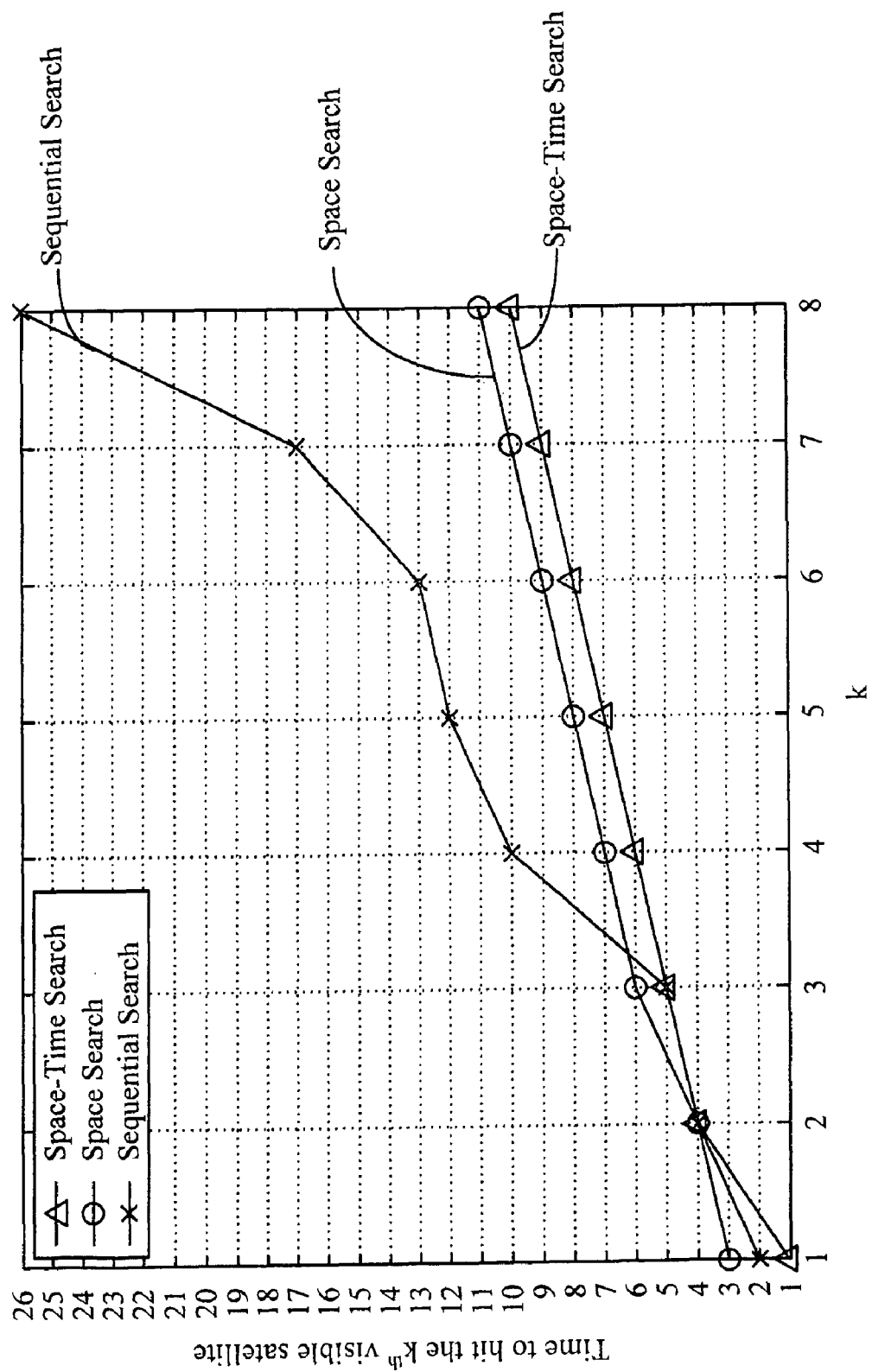
FIG. 16 is a chart showing a search time comparison among results obtained by the conventional sequential search method and the space and space-time search methods in accordance with the present invention.

In step S1600, the navigation processor 140 determines whether a predetermined number of satellites have been acquired. If so, the process can be ended at step S1610. Otherwise, the process goes to step S1620, in which the candidate satellite list candList is updated. As the above embodiment, once a satellite has been searched, it is removed from candList no matter it is hit or not. In another embodiment, a satellite is removed from candList only if it is hit. After updating candList, the navigation processor 140 determines whether the candidate satellite list candList is empty in step S1630. The candidate satellite list candList is not empty (i.e. candList≠{ }), it means that the current round of search has not been finished yet. The process goes back to step S1550, the navigation processor 140 calculates the mean visibility for each candidate satellite of the updated candList based on the reduced userST. In the present embodiment, if the candidate satellite list candList is empty (i.e. candList={ }), the navigation processor 140 puts all the unacquired satellites into the list to form a new initial candidate satellite list for the next round of search in step S1640, and the process goes back to step S1550 to run the next round of search FIG. 16 is a chart showing a search time comparison among results obtained by the conventional sequential search method and the methods in accordance with the present invention. If the conventional sequential search method is used, 26 searches are required to acquire the eight satellites. As described, by using the space search method of the present invention, the eight satellites can be hit in 11 searches. By using the space-time search method of the present invention, the eight satellites can be hit in 10 searches. To fix a position, at least four satellites are necessary to be acquired. If the conventional sequential search method is used, 10 searches are necessary to hit four satellites. By using the space search method of the present invention, the first four satellites can be hit in 7 searches. By using the space-time search method of the present invention, the first four satellites can be hit in 6 searches.

While the preferred embodiment of the present invention has been illustrated and described in details, various modifications and alterations can be made by persons skilled in this art. The embodiment of the present invention is therefore described in an illustrative but not in a restrictive sense. It is intended that the present invention should not be limited to the particular forms as illustrated, and that all modifications and alterations which maintain the spirit and realm of the present invention are within the scope as defined in the appended claims.

What is claimed is:

1. A satellite search method comprising steps of:
   (a) providing a candidate satellite list containing a plurality of satellites;
   (b) calculating mean visibility of at least one satellite listed in the candidate satellite list for positions with respect to a current time;

(c) selecting a satellite from the candidate satellite list according to the mean visibility of each satellite listed in the candidate satellite list;

(d) searching the selected satellite to obtain a search result;

(e) eliminating at least one position from the possible positions according to the search result; and (f) repeating steps (b) to (e).

2. The method of claim 1, wherein a satellite with the maximum mean visibility is selected from the candidate satellite list in step (c).

3. The method of claim 1, wherein each position where the searched satellite is not visible is eliminated in step (e) if the search result indicates that the searched satellite is acquired.

4. The method of claim 1, wherein each position where the searched satellite is visible is eliminated in step (e) if the search result indicates that the searched satellite is unacquired.

5. The method of claim 1, further comprising: (dl) verifying the search result after step (d) if the obtained search result indicates that the searched satellite is unacquired to make sure that the searched satellite is really unacquired.

6. The method of claim 5, wherein an integration interval for correlation is extended and then correlation of the satellite signal with the code is executed again using the extended integration interval to search the satellite in step (dl).

7. The method of claim 1, further comprising removing one satellite from the candidate satellite list once it has been searched to update the candidate satellite list.

8. The method of claim 1, further comprising removing one satellite from the candidate satellite list once it has been acquired to update the candidate satellite list.

9. The method of claim 1, further comprising repeating step (f) until a predetermined number of satellites have been acquired.

10. The method of claim 1, further comprising repeating step (f) until the candidate satellite list becomes empty.

11. A receiver for receiving and processing satellite signals to conduct a satellite search, the receiver comprising:

a correlation block for correlating the satellite signals with a code of a satellite so as to search the satellite; and a navigation processor for controlling the correlation block, wherein the navigation processor provides a candidate satellite list containing a plurality of satellites, calculates mean visibility of at least one satellite listed in the candidate satellite list for possible positions with respect to a current time, instructs the correlation block to search a satellite which is selected according to the mean visibility of each satellite to obtain a search result, and eliminates at least one position from the possible positions according to the search result.

12. The receiver of claim 11, wherein the navigation processor selects a satellite with the maximum mean visibility from the candidate satellite list to search.

13. The receiver of claim 11, wherein the navigation processor eliminates each position where the searched satellite is not visible if the search result indicates that the searched satellite is acquired.

14. The receiver of claim 11, wherein the navigation processor eliminates each position where the searched satellite is visible if the search result indicates that the searched satellite is unacquired.

15. The receiver of claim 11, wherein the navigation processor further instructs the correlation block to verify the search result if the obtained search result indicates that the searched satellite is unacquired to make sure that the searched satellite is really unacquired.

16. The receiver of claim 15, wherein the navigation extends an integration interval for correlation and then instructs the correlation block to execute correlation of the satellite signal with the code again using the extended integration interval to search the satellite so as to verify the search result.

17. The receiver of claim 11, wherein the navigation processor removes a satellite from the candidate satellite list once the satellite has been searched to update the candidate satellite list.

18. The receiver of claim 11, wherein the navigation processor removes a satellite from the candidate satellite list once the satellite has been acquired to update the candidate satellite list.

19. The receiver of claim 11, wherein the navigation processor instructs to stop satellite search when a predetermined number of satellites have been acquired.

20. The receiver of claim 11, wherein the navigation processor instructs to stop satellite search when the candidate satellite list becomes empty.

* * * * *